(12) United States Patent
Whiting

(10) Patent No.: US 10,771,571 B2
(45) Date of Patent: Sep. 8, 2020

(54) METHOD AND SYSTEM FOR PINPOINTING THE LOCATION OF AN ELECTRONIC DEVICE

(71) Applicant: Xerox Corporation, Norwalk, CT (US)

(72) Inventor: John Whiting, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/268,137

(22) Filed: Feb. 5, 2019

(65) Prior Publication Data

US 2020/0252469 A1 Aug. 6, 2020

(51) Int. Cl.
| | |
|---|---|
| *H04L 29/08* | (2006.01) |
| *G06F 9/4401* | (2018.01) |
| *G06F 16/903* | (2019.01) |
| *H04N 1/00* | (2006.01) |
| *H04L 29/12* | (2006.01) |
| *G06F 3/12* | (2006.01) |

(52) U.S. Cl.
CPC ............ *H04L 67/18* (2013.01); *G06F 9/4401* (2013.01); *G06F 16/90335* (2019.01); *H04L 61/2076* (2013.01); *H04N 1/00928* (2013.01); *G06F 3/1204* (2013.01); *G06F 3/1231* (2013.01); *G06F 3/1243* (2013.01); *H04L 61/6022* (2013.01)

(58) Field of Classification Search
CPC ............................ H04L 67/18; G06F 16/90335
See application file for complete search history.

(56) References Cited

U.S. PATENT DOCUMENTS

| | | | |
|---|---|---|---|
| 6,601,097 B1 | 7/2003 | Cheston et al. | |
| 6,728,632 B2 | 4/2004 | Medl | |
| 7,702,309 B2 | 4/2010 | Faccin et al. | |
| 9,225,681 B2 | 12/2015 | Diener et al. | |
| 10,135,729 B2 | 11/2018 | Unnimadhavan et al. | |
| 2003/0156577 A1* | 8/2003 | Dunlap | H04L 29/06 370/352 |
| 2005/0174609 A1 | 8/2005 | Thurlow | |
| 2006/0256736 A1* | 11/2006 | Koehler, Jr. | H04L 29/12009 370/254 |
| 2008/0215286 A1 | 3/2008 | Mealy et al. | |
| 2010/0260066 A1* | 10/2010 | August | H04L 41/5058 370/254 |
| 2013/0223441 A1 | 8/2013 | Meyer et al. | |
| 2014/0085650 A1* | 3/2014 | Redfield | H04L 41/12 358/1.13 |
| 2017/0308585 A1 | 10/2017 | Quirk et al. | |
| 2017/0308727 A1 | 10/2017 | Lombardi et al. | |

* cited by examiner

*Primary Examiner* — Ibrahim Siddo
(74) *Attorney, Agent, or Firm* — Luis M. Ortiz; Kermit D. Lopez; Ortiz & Lopez, PLLC

(57) ABSTRACT

A method and system for determining the location of an electronic device, can involve detecting a change in a unique identifier associated with an electronic device connected to a subnetwork, registering a notification on the electronic device, in response to detecting the change in the unique identifier, and receiving data regarding the electronic device including a physical location of the electronic device, after the notification has been registered on the electronic device and in response to a query generated after a subsequent boot up of the electronic device. The subnetwork can include a portion of a network that shares a common address component, and the unique identifier can include a MAC (Media Access Control) address that uniquely identifies the electronic device on the network.

20 Claims, 7 Drawing Sheets

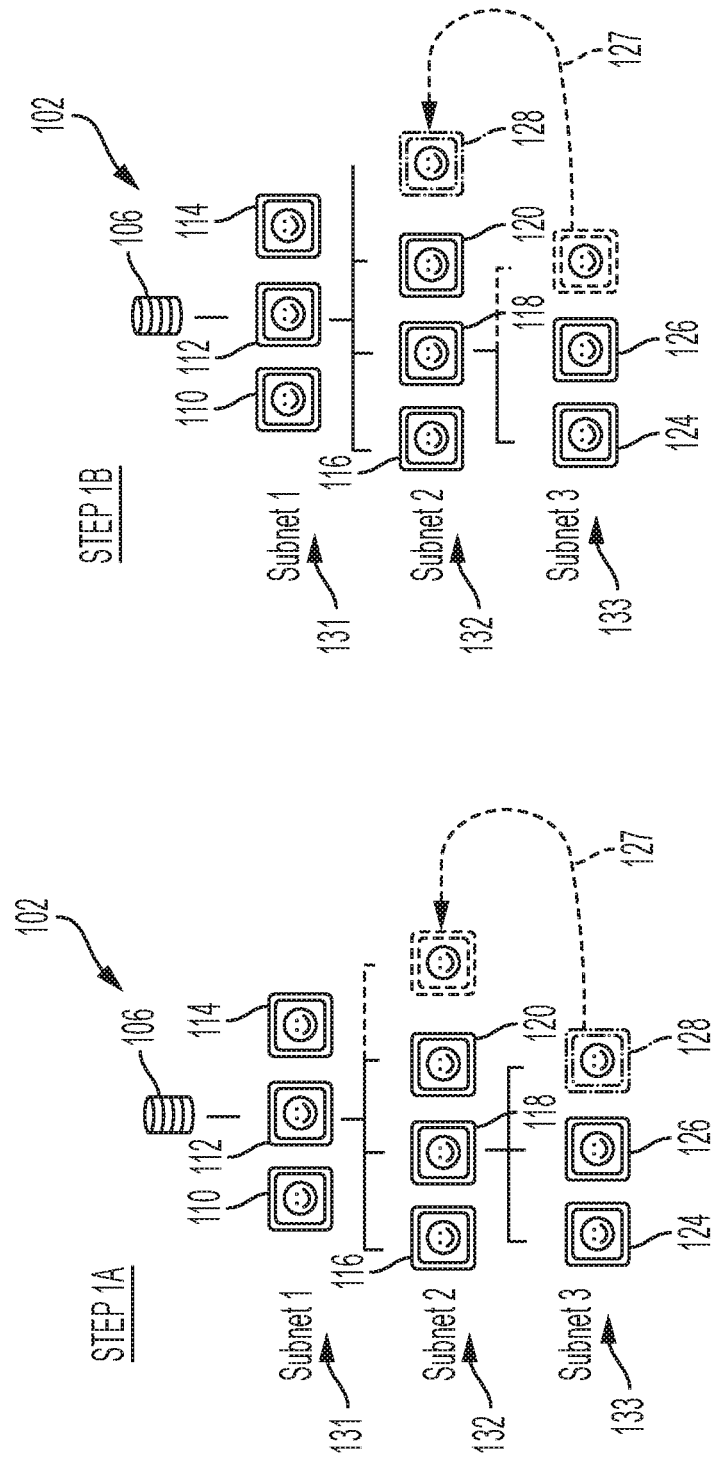

METHOD AND SYSTEM FOR PINPOINTING THE LOCATION OF AN ELECTRONIC DEVICE

TECHNICAL FIELD

Embodiments are generally related to device management systems. Embodiments also relate to methods and systems for device asset tracking. Embodiments are also related to methods and systems for identifying and tracking the physical location of a networked electronic device.

BACKGROUND

The tracking of assets is a critical aspect of inventory management. Large organizations may need to track and manage electronic devices used by employees, such as computers, printers, scanners, cellular phones, and so on. Tracking and management can be performed using an application that is installed on the device that reports to a centralized tracking and managing system. In other situations, tracking solutions can be implemented, which may consider a MAC address associated with an electronic device and subnet (i.e., "subnetwork") address changes to attempt to track such equipment. A shortfall in this approach is that it does not pinpoint the physical location of the device. A subnet can cover a huge area and it is not unusual for such electronic devices to be physically moved without being detected by a "change in subnet address", with the detection via subnet address change being too corpulent.

Previous solutions involved tracking the exact physical locations in a manual way, or ignoring the problem due to the complexity of keeping track of the locations of many hundreds of electronic devices. Many problems resulted from not knowing where all electronic devices in an organizations' fleet are located, particularly when attempting to service a particular electronic device that cannot be found.

BRIEF SUMMARY

The following summary is provided to facilitate an understanding of some of the features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved device management methods and systems.

It is another aspect of the disclosed embodiments to provide for methods and systems for device asset tracking.

It is a further aspect of the disclosed embodiments to provide for methods and systems for identifying and tracking the physical location of a networked electronic device.

It is also an aspect of the disclosed embodiments to provide for a method and system for pinpointing the physical location of an electronic device based on information collected from a query triggered by the detection of a new MAC address on a subnetwork.

The aforementioned aspects and other objectives and advantages can now be achieved as described herein. In an embodiment, a method for determining the location of an electronic device, can involve detecting a change in a unique identifier associated with an electronic device connected to a subnetwork, registering a notification on the electronic device, in response to detecting the change in the unique identifier associated with the electronic device, and receiving data regarding the electronic device including a physical location of the electronic device, after the notification has been registered on the electronic device and in response to a query generated after a subsequent boot up of the electronic device.

In an embodiment of the method, the subnetwork can include a portion of a network that shares a common address component.

In an embodiment of the method, the unique identifier can include a MAC (Media Access Control) address that uniquely identifies the electronic device on the network.

In an embodiment of the method, a step or operation can involve triggering the change in the unique identifier associated with the electronic device by a change in the MAC address.

In an embodiment of the method, the change in the unique identifier associated with the electronic device can include physical location information in addition to the MAC address.

In an embodiment of the method, the electronic device can include an MFP (Multifunction Peripheral).

In another embodiment, a system for determining the location of an electronic device, can include at least one processor, and a non-transitory computer-usable medium embodying computer program code, the computer-usable medium capable of communicating with the at least one processor. The computer program code can include instructions executable by the at least one processor and configured for: detecting a change in a unique identifier associated with an electronic device connected to a subnetwork, registering a notification on the electronic device, in response to detecting the change in the unique identifier associated with the electronic device, and receiving data regarding the electronic device including a physical location of the electronic device, after the notification has been registered on the electronic device and in response to a query generated after a subsequent boot up of the electronic device.

In an embodiment of the system, the subnetwork can include a portion of a network that shares a common address component.

In an embodiment of the system, the subnetwork can include a subnet comprising a logical partition of an IP (Internet Protocol) network into at least one network segment.

In an embodiment of the system, the unique identifier can include a MAC (Media Access Control) address that uniquely identifies the electronic device on the network.

In an embodiment of the system, the instructions can be further configured for triggering the change in the unique identifier associated with the electronic device by a change in the MAC address.

In an embodiment of the system, the change in the unique identifier associated with the electronic device can include physical location information in addition to the MAC address.

In an embodiment of the system, the electronic device can include an MFP (Multifunction Peripheral).

In another embodiment, a system for determining the location of an electronic device, can include a subnetwork and an electronic device associated with a unique identifier, wherein a change in the unique identifier is detectable, and wherein in response to detecting the change in the unique identifier, a notification is registered on the electronic device, and wherein data regarding the electronic device including a physical location of the electronic device is received, after the notification has been registered on the electronic device and in response to a query generated after a subsequent boot up of the electronic device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a schematic diagram of a system in which an electronic device is moved to a different location, in accordance with an embodiment;

FIG. 2 illustrates a schematic diagram of a system, in which the electronic device is now located a different subnetwork, in accordance with an embodiment;

DETAILED DESCRIPTION

Figure 3:
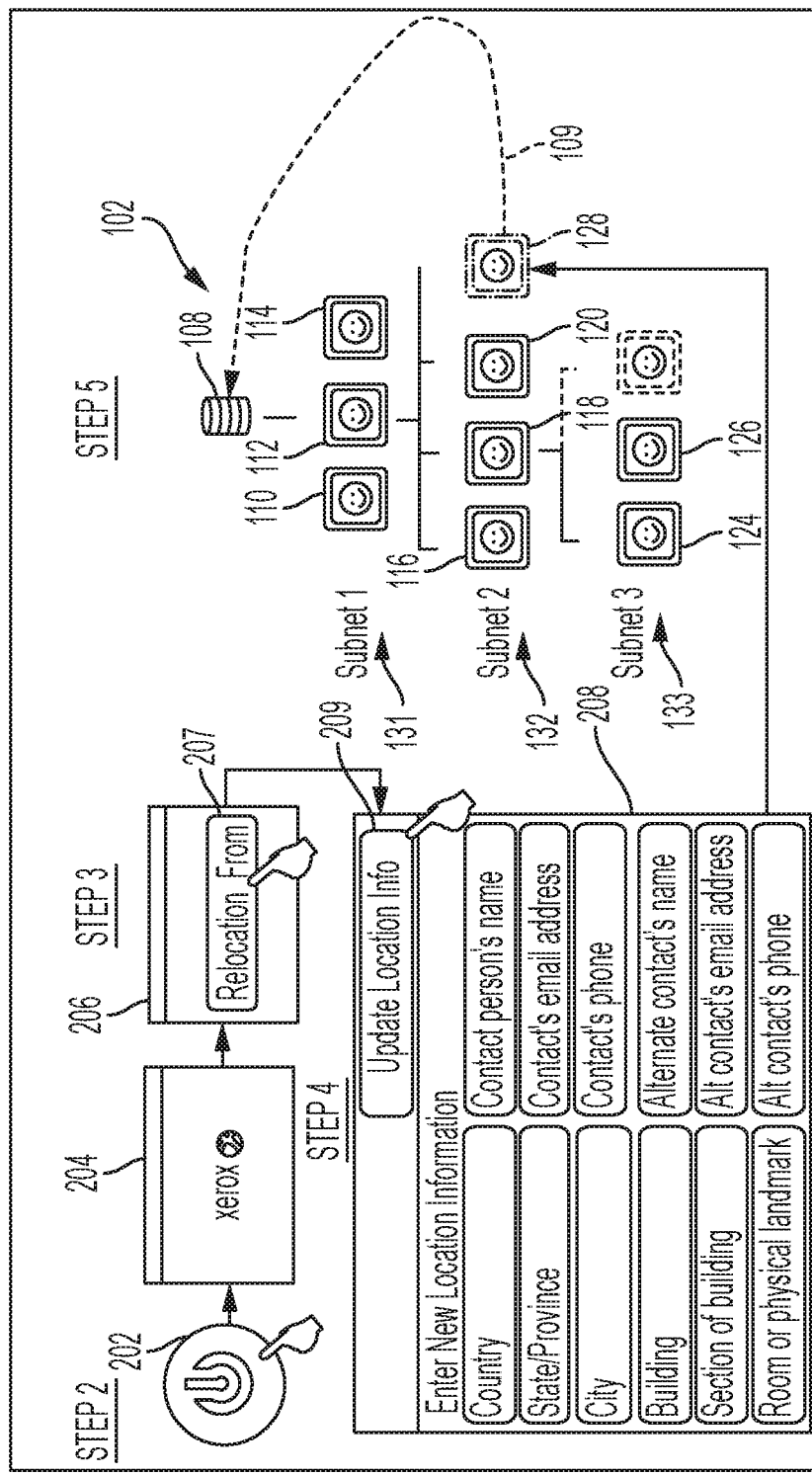
FIG. 3 illustrates a schematic diagram in which the physical location of the electronic device is automatically updated, in accordance with an embodiment.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. The term "or" if used to associate a list, such as A, B, or C, may be intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon the context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

The term "subnetwork" or "subnet" as utilized can relate to a portion of a network that shares a common address component. On TCP/IP networks, a subnet can be defined as all devices whose IP addresses have the same prefix. The term "electronic device" as utilized herein can relate to an MFP (Multifunction Peripheral) or an MFD (Multifunction Device). An MFP is an electronic device that can be composed of multiple peripheral functionalities and capabilities, including printing, copying, scanning, and so on. An MFP can provide centralized document management for large and small enterprises. Manufacturers may segment MFPs by page-per-minute (PPM) speed. An MFD is an electronic device that has multiple functions. An example of this is a printer that also makes copies, faxes, scans and so on.

Another example of an MFD is a CD or DVD that contains multiple applications on the same disk. For example, this may be a Mac and PC version of the same software or media meant to be played on more than one platform. Other examples of an electronic device include data-processing systems, servers, computing devices, portable electronic computing devices such as smartphones and tablet computers, and so on.

The disclosed embodiments can include features in which when a MAC address change and/or addition is detected within a subnet, and an alert can be registered on the electronic device. Upon the next boot up of the electronic device, a query or card can be raised on a local UI (User Interface) or GUI (Graphical User Interface) associated with the electronic device, which can invite or invoke a user to define the exact physical location of the electronic device along with any other pertinent changes that may have taken place concurrently with the MAC address change (e.g. new System Admin, new organization, new contact person, etc.). This can be effectively accomplished through a query. (Note: the electronic device may be configured to require the query to be answered or simply provide a no-obligation opportunity) or by filling out an on-screen location card.

When the user finishes entering the information and selects 'Save', the new information, including the exact physical location of the MFP can be transmitted via methods such as a cloning tree, email, or even printing out a hard copy with a QR code along with a snail-mail address to which a data sheet can be. Upon receiving the new information, a centralized IT department can automatically (or manually) update the new information in their database and reassign the device's cloning policies to treat the electronic device according to its new information.

The disclosed embodiments are more useful than current approaches because the information is actually filled out by a person, presumably someone who is responsible for the electronic device, and in whose interest it would be to have the location of the device known by service and/or others who may need to pinpoint where the electronic device is physically located.

FIG. 1 illustrates a schematic diagram of a system 102 in which an electronic device 128 is moved to a different location, in accordance with an embodiment. The system 102 includes a tracking database 106 and a group of sub-networks including a subnet 131, a subnet 132, and a subnet 133. The subnet 131 can include an electronic device 110, an electronic device 112, and an electronic device 114. The subnet 132 includes an electronic device 116, an electronic device 118 and an electronic device 120. The subnet 133 can include an electronic device 124, an electronic device 126, and an electronic device 128. As indicated by the dashed arrow 127, however, the electronic device 128 can be moved to a different location, such as to a placement within the subnet 132. The tracking database 106 can be configured as a database that can contain data indicative of the physical location of electronic devices, such as the electronic device 128. FIG. 1 thus illustrates a Step 1A involving the movement of the electronic device 128 to a different location as indicated by the dashed arrow 127.

Note that in the figures and description herein, identical or similar parts or elements may be indicated by identical reference numerals. In addition, each electronic device may be implemented as a client device. Client devices within a company or an organization are generally connected to one another via a local subnet, and local subnets may be connected to other networks by a gateway. Data addressed to computers outside the subnet can be first directed to the gateway before sending the data out to the target computer. Each client device on the local subnet can be configured with the IP (Internet Protocol) address of the local subnet gateway.

FIG. 2 illustrates a schematic diagram of the system 102, in which the electronic device 128 is now located in a different subnet 132, in accordance with an embodiment. That is, as shown in FIG. 2, the electronic device 128 has now been moved to a different location, which places the electronic device 128 in the subnet 132, which is different from the subnet 133 in which the electronic device 128 was originally located. FIG. 2 illustrates a Step 2A in which the electronic device has been moved away from its original location in subnet 133.

FIG. 3 illustrates a schematic diagram in which the physical location of the electronic device 128 is automatically updated, in accordance with an embodiment. FIG. 3 depicts additional operational steps including a Step 2 in which the newly relocated electronic device 128 is booted up, as indicated by the graphic 202 and graphic 204. That is, the graphics 202 and 204 indicate that a user can power up the newly relocated electronic device 128 for the first time. Thereafter, in a Step 3, as depicted at graphic 206, the electronic device 128 recognizes that it has a new subnetwork and the electronic device 128 can display a graphical button 207 (labeled "Relocation Form"), which a user can select.

Note that as utilized herein the term "boot up" or "booting up" involves the start up of an electronic device (e.g., a computer system) by providing the electronic device with the required electrical power and loading the startup services until an operating system is loaded. This activity can relate to the process of starting an electronic device such as a computer from a dead or offline state, thus making it available to perform any computing operation. In addition, the term "button" (as in the "button 207" or the "button 209") relates to a graphic element in a GUI or UI that, when activated, can perform a specified function. A user can activate a button by "clicking" on it with a mouse or touching it with his or her finger in the case of a touchscreen GUI or a touchscreen UI, or if the button has the focus, by hitting a Return or Enter key.

Upon selecting the button 207 (i.e., the Relocation Form), a user can input various information in a Step 4, as indicated by a graphically displayed location form 208, such as, for example, "Country", "State/Province", "City", "Building", "Section of Building", "Room or Physical Landmark", "Contact person's name", "Contact's Email Address", "Contact's Phone", "Alternate Contact's Name", "Alternate Contact's Email Address", and "Alternate Contact's Phone". Once such information has been entered including physical location information associated with the electronic device 128, a user may select the "Updated Location Info" button so that such information may be saved into a database such as the database 108 shown in FIG. 3.

Step 5 depicted in FIG. 3 can involve an operation in which the new location of the electronic device 128 and the contact information (along with subnetwork change data) may be automatically sent to the database 108 via existing cloning and/or a software update pathway, as indicated by the dashed arrow 109. FIG. 3 thus illustrates steps involving an automatic physical location update including new physical location information sent to the database 108.

Figure 4:
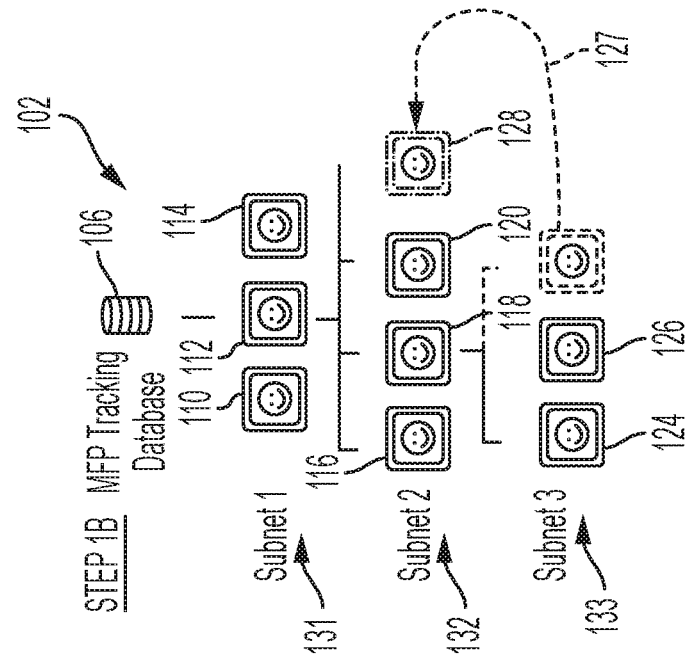
FIG. 4 illustrates a schematic diagram of the system of in which an electronic device is moved to a difference location, in accordance with an embodiment.
Figure 5:
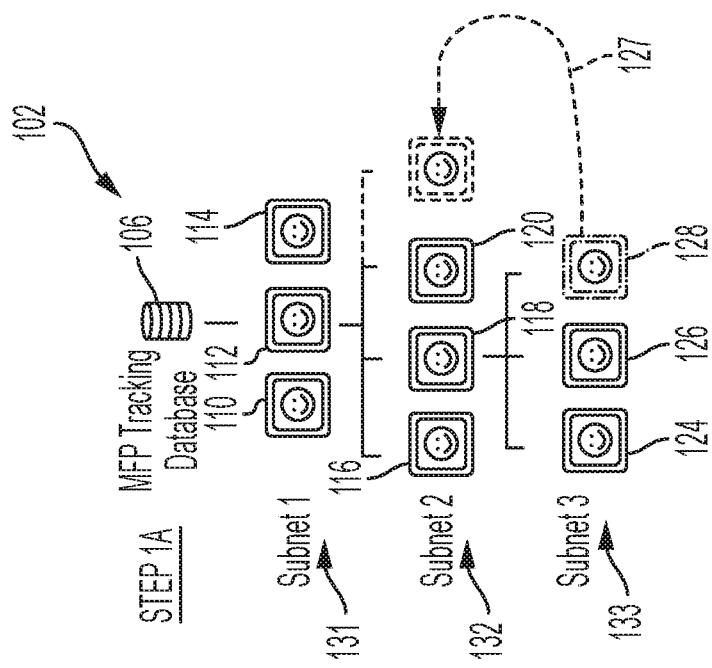
FIG. 5 illustrates a schematic diagram of a system in which the electronic device is now in a different subnetwork, in accordance with an embodiment.

FIG. 4 illustrates a schematic diagram of the system 102 and a Step 1A in which the electronic device 128 is moved to a different location, in accordance with an embodiment. FIG. 5 illustrates a schematic diagram of the system 102 and a Step 1B in which the electronic device 128 is now in a different subnetwork 128, in accordance with an embodiment. FIGS. 4-5 illustrate a situation in which a manual physical location update may be necessary. That is, as indicated by FIGS. 4-5, the electronic device 128 changes physical location and a cloning pathway does not exist.

Figure 6:
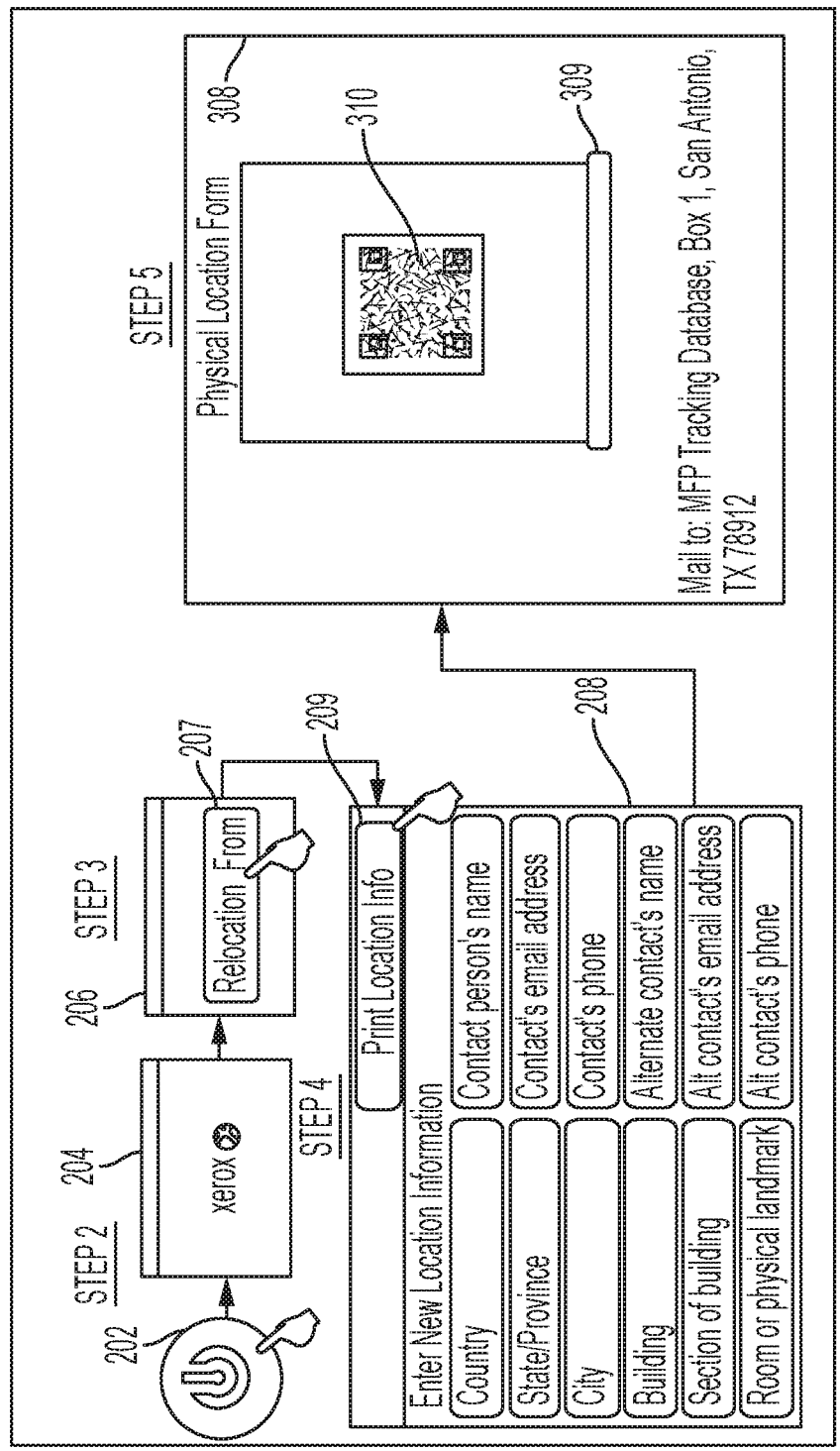
FIG. 6 illustrates a schematic diagram of a system in which the physical location of an electronic device is automatically updated and wherein a cloning pathway does not exist, in accordance with an example embodiment.

FIG. 6 illustrates a schematic diagram in which the physical location of the electronic device 128 is automatically updated and wherein a cloning pathway does not exist, in accordance with an example embodiment. Note that Step 2, Step 3, and Step 4 shown in FIG. 6 are similar to Step 2, Step 3, and Step 4 depicted in FIG. 3, with the addition of a Step 5 in which the new location and contact information can be automatically printed via the electronic device 128 and rendered in a physical location form 308 with a QR code 310. The new location and contact information (along with any subnetwork changes) can be automatically printed out via the electronic device 128 (or another device) with an address 309 to which the form 308 can be mailed.

Figure 7:
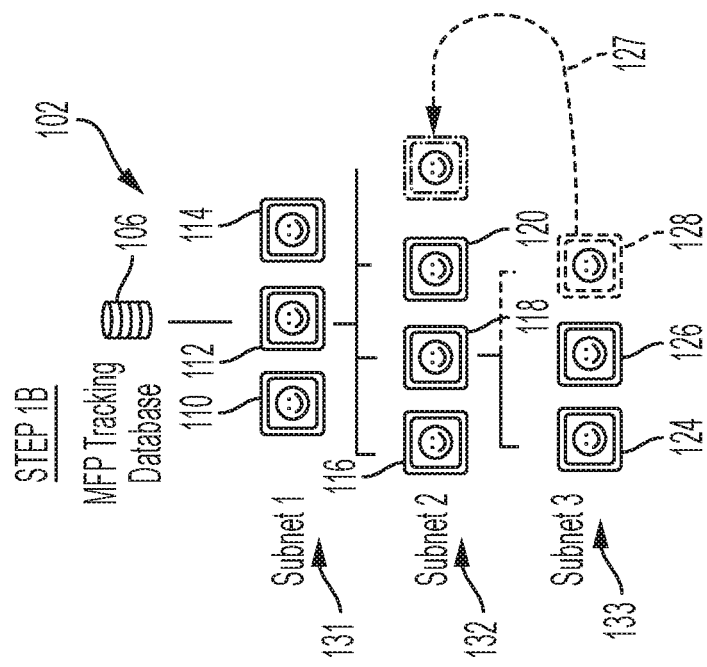
FIG. 7 illustrates a schematic diagram of a system in which an electronic device is moved to a different location, in accordance with an example embodiment.
Figure 8:
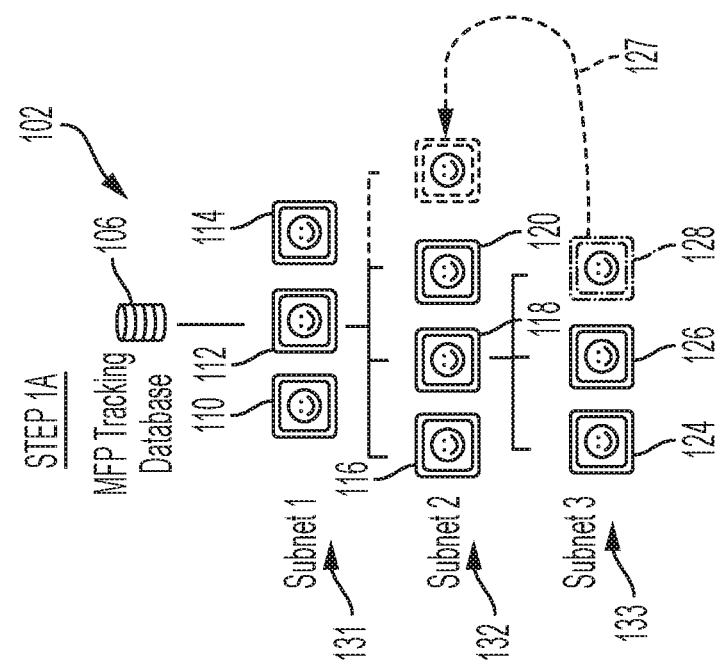
FIG. 8 illustrates a schematic diagram of a system in which the different location of the electronic device does not place the electronic device in a different subnetwork, in accordance with an example embodiment.

FIG. 7 illustrates a schematic diagram of the system 102 in which a Step 1A involves the electronic device 128 moving to a different location, in accordance with an example embodiment. FIG. 8 illustrates a schematic diagram of the system 102 in which a Step 1B involves the electronic device 128 not placed in a different subnetwork, in accordance with an example embodiment. That is FIGS. 7-8 together illustrates a situation involving a non-MAC (Media Access Control) address driven physical location update. In this situation, the electronic device 128 changes its physical location, but a cloning pathway does exist. In other words, the different location does not place the electronic device 128 in a different subnetwork, so the detection of a new MAC address on the subnetwork is not detected.

Note that as utilized herein, the term "MAC address" refers to a hardware identification number that uniquely identifies each electronic device on a network. That is, a MAC address of an electronic device can be a unique identifier assigned to a network interface controller (NIC) for communications at the data link layer of a network segment. MAC addresses can be used as a network address for most IEEE 802 network technologies, including Ethernet, Wi-Fi and Bluetooth.

Figure 9:
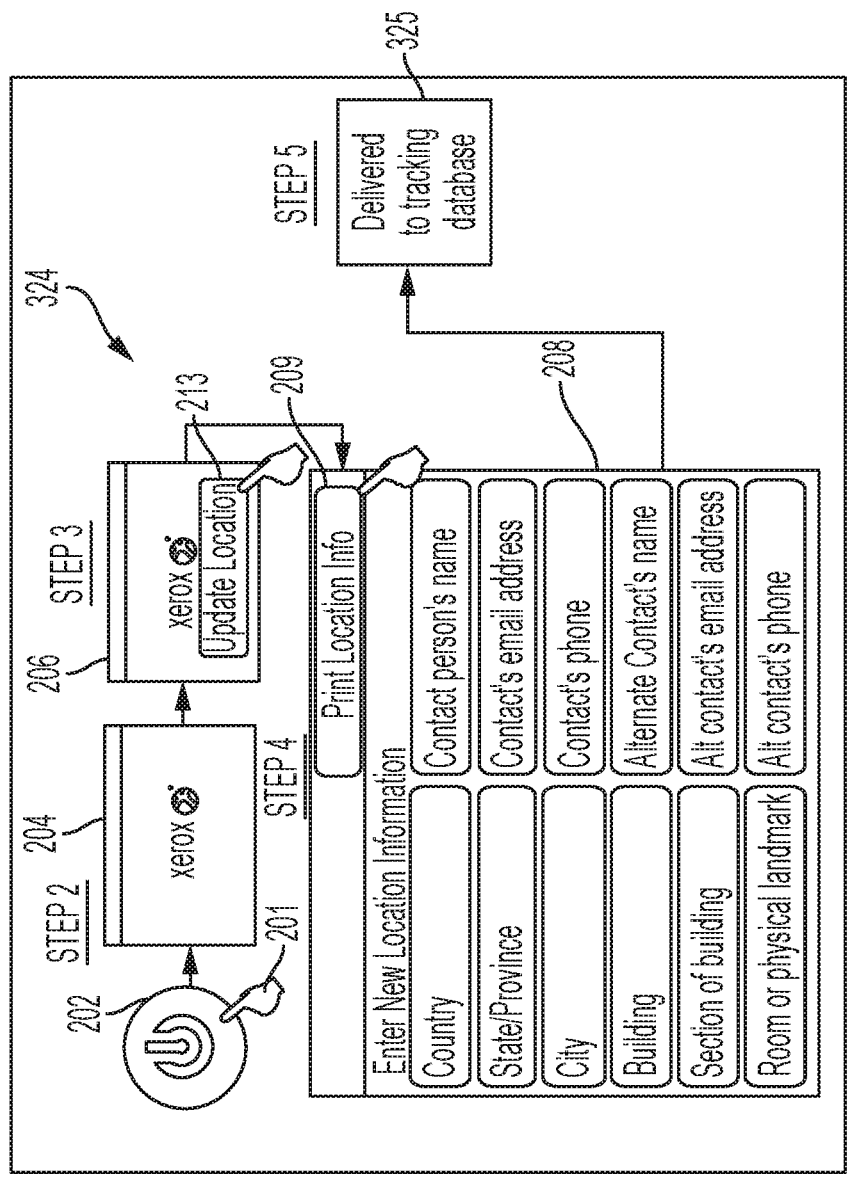
FIG. 9 illustrates a schematic diagram of a system in which an electronic device changes location but a cloning pathway does not exist, in accordance with an embodiment.

FIG. 9 illustrates a flow diagram depicting logical operational steps for an automatic physical location update in which an electronic device such as the previously discussed electronic device 128 changes a location but wherein a cloning pathway does not exist, in accordance with an embodiment. FIG. 9 illustrates additional Step 2, Step 3, Step 4, and Step 5, which following Step 1A and Step 1B shown in FIGS. 7-8. In Step 2, as indicated by graphic 201 and a warm up screen 204, a user can power up a newly relocated electronic device and the warm up screen 204 is then presented for the user. The subnetwork may not recognize that it has a new MAC address since the electronic device has been moved within the subnetwork. In Step 3, a relocation button can be raised.

That is, as shown at graphic 206, which can include a graphically displayed relocation button 213, the electronic device can display such a relocation button for a short period of time on the warm up screen. The user can then select the "relocation card" button 213. As discussed previously, a location form 208 can be displayed and new location and contact information can be entered using a "pop-up" soft keyboard, which is depicted in the location form 208 shown at Step 4. The user may then select an "Update Location Information" button (not shown in FIG. 9) to have this information entered. Finally, at Step 5, as shown at block 325, the new location/contact information can be delivered to the database 106 as discussed previously.

Thus, if an electronic device such as the electronic device 128 is moved from one location to another, the approach discussed above provides a solution for identifying the new physical location of the electronic device 128. This is particularly helpful when unauthorized personnel move electronic devices. This approach can detect when a new MAC address has appeared on a subnetwork and then raises a query upon boot up that allows a user to input data associated with the new location and other changes that may be peripheral to the electronic device's move.

The disclosed embodiments can include steps or operations for automatically or manually raising a location card or query such as the location form 208 which on-location personnel who are responsible for the electronic device can fill out and send to the database 106 via a cloning tree or other file transfer method. This query may be set up by policy to only be changed by someone with strong credentials, or may even block access to the electronic device until current information has been updated/confirmed (e.g., by policy).

The new information can then be delivered to the IP department using a clone tree capability or even by sending it via file transfer, snail mail or email to the IT manager. The printed or emailed file may contain the information in a QR (e.g., such as shown in FIG. 6) or other code that can be easily scanned into the database 106 upon receipt If an electronic device has been moved and its new MAC address has been detected on the subnetwork, a user may find it useful for a query or card to be raised on the boot-up screen (or default walkup screen). In some situations, the location card or location form 208 can be raised and the user can then fill in the location information using an on-screen soft keyboard as discussed previously When done, an "Update Location Info" button can be pressed and the new information can be sent to the tracking database 106.

Sometimes electronic devices such as MFDs may be moved within a subnetwork. In such a situation, the subnetwork may not recognize the electronic device's MAC address as new. This is where the disclosed embodiments can be particularly useful, since there is not an automatic method for providing information indicating that the electronic device has in fact been moved. To deal with this particular situation, an "Update Location" button can be presented for a limited time on a warm-up screen every time the electronic device is booted up. When authorized or unauthorized personnel physically move the electronic device, they can then update the physical location upon bootup. This feature can manually bring up the same query as described above, but not be triggered by a new MAC address recognized on the subnetwork. A new Location/Contact can be delivered to the database 106 as also delineated in other scenarios herein.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a bidirectional data communications network such as a local area network (LAN) or a wide area network (WAN), a wireless local area network (WLAN), wireless data network e.g., Wi-Fi, Wimax, 802.xx, and/or a cellular network or the bidirectional connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block or feature of the illustrations, and combinations of blocks or features, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks or elsewhere herein. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
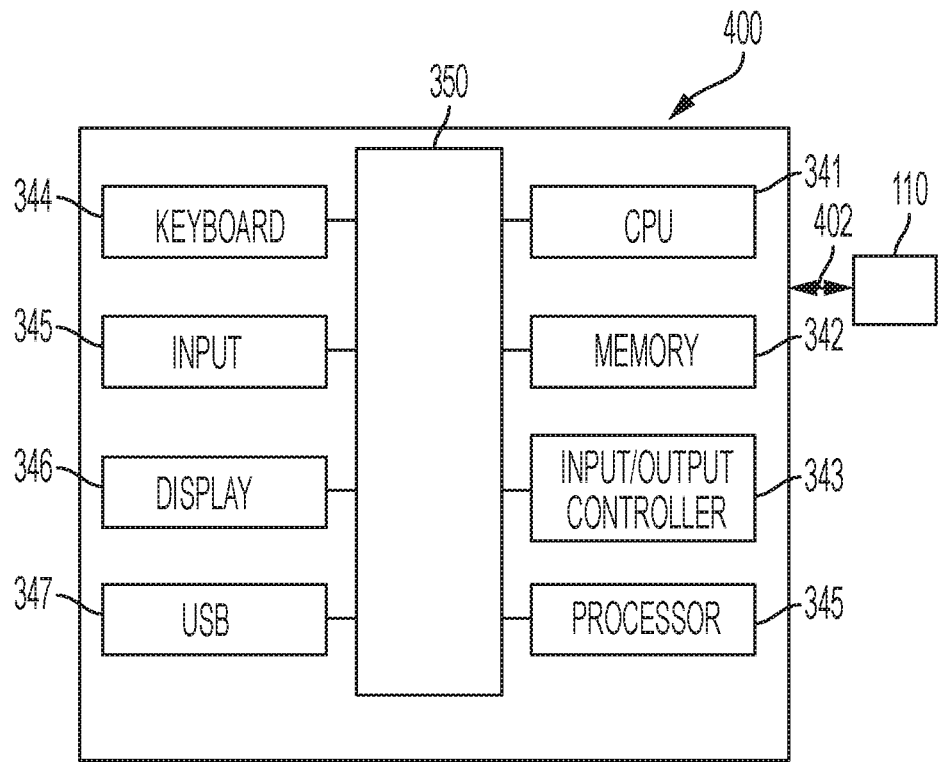
FIG. 10 illustrates a schematic view of a data-processing system, in accordance with an embodiment.
Figure 11:
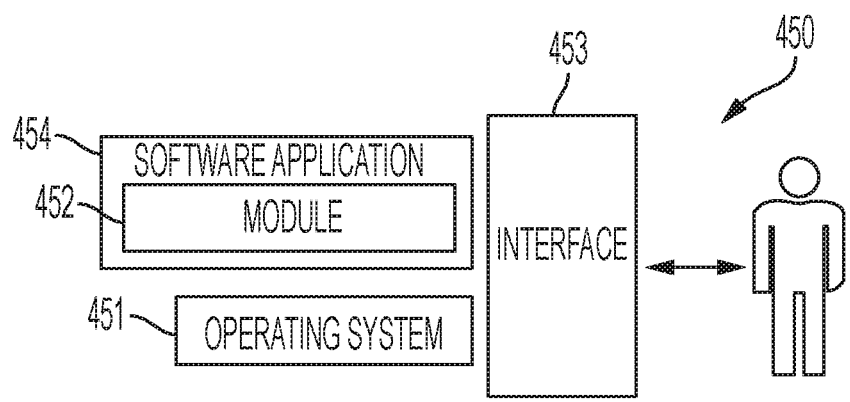
FIG. 11 illustrates a schematic view of a software system including a module, an operating system, and a user interface, in accordance with an embodiment.

FIGS. 10-11 are shown only as exemplary diagrams of data-processing environments in which example embodiments may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, some embodiments may be implemented in the context of a data-processing system 400 that can include, for example, one or more processors such as a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components. FIG. 8 is an example of a computing device that can be adapted for use in accordance with an embodiment.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a smartphone, a tablet computing device, a networked computer server, and so on, wherein each such device can be operably connected to and/or in communication with a client-server based network or other types of networks (e.g., cellular networks, Wi-Fi, etc). The data-processing system 400 can communicate with other devices such as, for example, an electronic device 110. Communication between the data-processing system 400 and the electronic device 110 can be bidirectional, as indicated by the double arrow 402. Such bidirectional communications may be facilitated by, for example, a computer network, including wireless bidirectional data communications networks.

FIG. 11 illustrates a computer software system 450 for directing the operation of the data-processing system 400 depicted in FIG. 10. Software application 454, stored for example in the memory 342 can include one or more modules such as module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions, steps or operations such as those discussed herein. Module 452 may also be composed of a group of modules and/or sub-modules.

The following discussion is intended to provide a brief, general description of suitable computing environments in which the system and method may be implemented. The disclosed embodiments can be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that can perform particular tasks or which can implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (e.g., accessible only to that module) and which can include source code that actually implements the routines in the module. The term module can also relate to an application, such as a computer program designed to assist in the performance of a specific task, such as word processing, accounting, inventory management, etc.

Based on the foregoing, it can be appreciated that different embodiments are disclosed herein. In an embodiment, a method for determining the location of an electronic device can involve steps, operations or instructions including detecting a change in a unique identifier associated with an electronic device connected to a subnetwork; registering a notification on the electronic device, in response to detecting the change in the unique identifier associated with the electronic device; and receiving data regarding the electronic device including a physical location of the electronic device, after the notification has been registered on the electronic device and in response to a query generated after a subsequent boot up of the electronic device.

In an embodiment, the subnetwork can include a portion of a network that shares a common address component. In another embodiment, the unique identifier can include a MAC (Media Access Control) address that uniquely identifies the electronic device on the network. In some embodiments, a step, operation or instruction can include triggering the change in the unique identifier associated with the electronic device by a change in the MAC address. In still other embodiments, the change in the unique identifier associated with the electronic device can comprise physical location information in addition to the MAC address. In some embodiments, the electronic device comprises can be an MFP (Multifunction Peripheral).

In another embodiment, a system for determining the location of an electronic device, can include at least one processor, and a non-transitory computer-usable medium embodying computer program code, the computer-usable medium capable of communicating with the at least one processor. The computer program code can include instructions executable by the at least one processor and configured for: detecting a change in a unique identifier associated with an electronic device connected to a subnetwork; registering a notification on the electronic device, in response to detecting the change in the unique identifier associated with the electronic device; and receiving data regarding the electronic device including a physical location of the electronic device, after the notification has been registered on the electronic device and in response to a query generated after a subsequent boot up of the electronic device.

In an embodiment of the system, the subnetwork can include a portion of a network that shares a common address component. In another embodiment of the system, the subnetwork can comprises a subnet that includes a logical partition of an IP (Internet Protocol) network into at least one network segment. In another embodiment of the system, the unique identifier can include a MAC (Media Access Control) address that uniquely identifies the electronic device on the network. In some system embodiments, the aforementioned instructions can be further configured for triggering the change in the unique identifier associated with the electronic device by a change in the MAC address. In another system embodiment, the change in the unique identifier associated with the electronic device can include a change in physical location information in addition to the MAC address. In yet another system embodiment, the electronic device can be an MFP (Multifunction Peripheral).

In another embodiment, a system for determining the location of an electronic device, can include a subnetwork and an electronic device associated with a unique identifier. In this system, a change in the unique identifier can be detectable. In response to detecting the change in the unique identifier, a notification can be registered on the electronic device. Data regarding the electronic device including a physical location of the electronic device can be received, after the notification has been registered on the electronic device and in response to a query generated after a subsequent boot up of the electronic device.

It can be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for determining the location of an electronic device, comprising:
    detecting a change in a unique identifier associated with an electronic device connected to a subnetwork, wherein the change comprises at least one of a change in an address associated with the unique identifier and an addition of the address associated with the unique identifier;
    registering a notification on the electronic device, in response to detecting the change in the unique identifier associated with the electronic device;
    receiving data regarding the electronic device including a physical location of the electronic device and contact information, after the notification has been registered on the electronic device and in response to a query generated after a subsequent boot up of the electronic device; and after the subsequent boot up of the electronic device, invoking a user to define an exact physical location of the electronic device and other pertinent changes that have taken place concurrently with the change to the unique identifier.

2. The method of claim 1 wherein the subnetwork comprises a portion of a network that shares a common address component.

3. The method of claim 1 wherein the unique identifier comprises a MAC (Media Access Control) address that uniquely identifies the electronic device on the network.

4. The method of claim 3 further comprising triggering the change in the unique identifier associated with the electronic device by a change in the MAC address.

5. The method of claim 3 wherein the change in the unique identifier associated with the electronic device comprises physical location information in addition to the MAC address.

6. The method of claim 1 wherein the electronic device comprises an MFP (Multifunction Peripheral) and wherein the invoking of the user, further comprises graphically displaying a relocation card for the user to define the exact physical location of the electronic device and the other pertinent changes.

7. A system for determining the location of an electronic device, comprising:
 at least one processor; and
 a non-transitory computer-usable medium embodying computer program code, the computer-usable medium capable of communicating with the at least one processor, the computer program code comprising instructions executable by the at least one processor and configured for:
  detecting a change in a unique identifier associated with an electronic device connected to a subnetwork, wherein the change comprises at least one of a change in an address associated with the unique identifier and an addition of the address associated with the unique identifier;
  registering a notification on the electronic device, in response to detecting the change in the unique identifier associated with the electronic device;
  receiving data regarding the electronic device including a physical location of the electronic device and contact information, after the notification has been registered on the electronic device and in response to a query generated after a subsequent boot up of the electronic device; and
  after the subsequent boot up of the electronic device, invoking a user to define an exact physical location of the electronic device and other pertinent changes that have taken place concurrently with the change to the unique identifier.

8. The system of claim 7 wherein the subnetwork comprises a portion of a network that shares a common address component.

9. The system of claim 7 wherein the subnetwork comprises a subnet comprising a logical partition of an IP (Internet Protocol) network into at least one network segment.

10. The system of claim 7 wherein the unique identifier comprises a MAC (Media Access Control) address that uniquely identifies the electronic device on the network.

11. The system of claim 10 wherein the instructions are further configured for triggering the change in the unique identifier associated with the electronic device by a change in the MAC address.

12. The system of claim 10 wherein the change in the unique identifier associated with the electronic device comprises physical location information in addition to the MAC address.

13. The system of claim 7 wherein the electronic device comprises an MFP (Multifunction Peripheral) and wherein the invoking of the user, further comprises graphically displaying a relocation card for the user to define the exact physical location of the electronic device and the other pertinent changes.

14. A system for determining the location of an electronic device, comprising:
 a subnetwork and an electronic device associated with a unique identifier,
 wherein a change in the unique identifier is detectable, wherein the change comprises at least one of a change in an address associated with the unique identifier and an addition of the address associated with the unique identifier;
 wherein in response to detecting the change in the unique identifier, a notification is registered on the electronic device, and wherein data regarding the electronic device including a physical location of the electronic device and contact information is received, after the notification has been registered on the electronic device and in response to a query generated after a subsequent boot up of the electronic device; and
 wherein after the subsequent boot up of the electronic device, invoking a user to define an exact physical location of the electronic device and other pertinent changes that have taken place concurrently with the change to the unique identifier.

15. The system of claim 14 wherein the subnetwork comprises a portion of a network that shares a common address component.

16. The system of claim 14 wherein the subnetwork comprises a subnet comprising a logical partition of an IP (Internet Protocol) network into at least one network segment.

17. The system of claim 16 wherein the unique identifier comprises a MAC (Media Access Control) address that uniquely identifies the electronic device on the network.

18. The system of claim 17 wherein the change in the unique identifier associated with the electronic device is triggered by a change in the MAC address.

19. The method of claim 17 wherein the change in the unique identifier associated with the electronic device comprises physical location information in addition to the MAC address.

20. The system of claim 14 wherein the electronic device comprises an MFP (Multifunction Peripheral) and wherein the invoking of the user, further comprises graphically displaying a relocation card for the user to define the exact physical location of the electronic device and the other pertinent changes.

* * * * *